United States Patent
Brosgi

[11] Patent Number: 5,108,332
[45] Date of Patent: Apr. 28, 1992

[54] METHOD OF MANUFACTURING A LIQUID-CRYSTAL CELL

[75] Inventor: Stefan Brosgi, Stuttgart, Fed. Rep. of Germany

[73] Assignee: Nokia Unterhaltungeselektronik GmbH, Fed. Rep. of Germany

[21] Appl. No.: 635,139

[22] PCT Filed: Jun. 27, 1989

[86] PCT No.: PCT/EP89/00721
§ 371 Date: Dec. 28, 1990
§ 102(e) Date: Dec. 28, 1990

[87] PCT Pub. No.: WO90/00263
PCT Pub. Date: Jan. 11, 1990

[30] Foreign Application Priority Data
Jun. 29, 1988 [DE] Fed. Rep. of Germany ....... 3821820

[51] Int. Cl.⁵ .............................. H01J 9/26; H01J 9/24
[52] U.S. Cl. .......................................... 445/24; 445/25
[58] Field of Search ..................................... 445/24, 25

[56] References Cited
U.S. PATENT DOCUMENTS

| | | | |
|---|---|---|---|
| 3,494,498 | 7/1983 | Kastelic | 241/23 |
| 3,698,449 | 10/1972 | Sorkin et al. | 445/24 |
| 4,464,134 | 8/1984 | Lackner et al. | 445/24 |
| 4,786,268 | 11/1988 | Zondler et al. | 445/25 |

FOREIGN PATENT DOCUMENTS
54-132793 10/1979 Japan .................... 445/24

*Primary Examiner*—Kurt Rowan
*Assistant Examiner*—Jeffrey T. Knapp
*Attorney, Agent, or Firm*—Ware, Fressola, Van Der Sluys & Adolphson

[57] ABSTRACT

A method of introducing the liquid crystal into a liquid-crystal cell is disclosed in which the liquid-crystal material is cooled to the solid state, ground to a grain size less than 50 micrometers, and subsequently sprinkled into the space formed by the spacer and a first substrate. The liquid-crystal cell is then covered and sealed with a second substrate in a vacuum. Thereafter, the liquid crystal is heated to a temperature above the clearing point. The liquid crystal cell can be used as a liquid-crystal display or as a light valve of an optical printer.

4 Claims, 1 Drawing Sheet

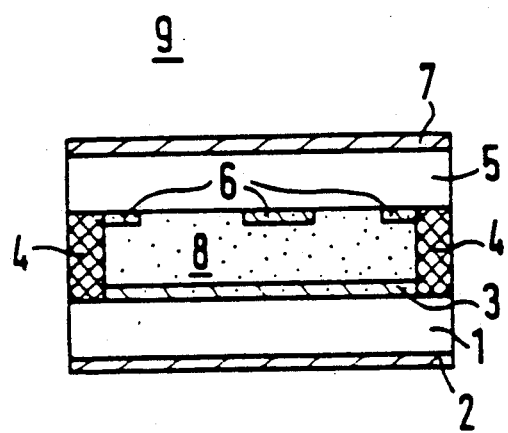

METHOD OF MANUFACTURING A LIQUID-CRYSTAL CELL

BACKGROUND OF THE INVENTION

1. Field of the Invention

The present invention relates to a method of manufacturing a liquid-crystal cell and more particularly to a method of preparing and placing liquid-crystal material into the liquid-crystal cell.

2. Description of the Prior Art

DE 35 32 486 A1 discloses a method of manufacturing a liquid-crystal cell in which a spacer is positioned on a first substrate and in which the liquid crystal is then printed onto the substrate within the spacer. Thereafter, the liquid-crystal cell is sealed with a second substrate.

The prior art method has the disadvantage that widely varying amounts of liquid-crystal material must be printed onto the substrate.

SUMMARY OF THE INVENTION

It is object of the invention to provide a method of manufacturing a liquid-crystal cell into which the liquid-crystal material can be introduced in a simple manner and in a precisely defined quantity.

This object is attained using a method of manufacturing a liquid-crystal cell of the type having a first substrate, a bordering means on the first substrate, a second substrate covering the first substrate and the bordering means, and a liquid phase liquid-crystal disposed in a space between the substrates and the bordering means. The method includes the steps of cooling the liquid phase liquid-crystal material to a temperature lower than 20° C. below the melting point of said liquid-crystal material so that the material solidifies. The material is then ground to a grain size of less than 50 micrometers after which the material is sprinkled into the space between the first substrate and the bordering means. The liquid-crystal material is dried to remove any moisture that may have accumulated during the cooling step and afterwards the liquid-crystal cell is sealed with the second substrate in a vacuum. In a final step the liquid-crystal material is heated to a temperature above the clearing point of the liquid-crystal material so that the material is in proper condition for use in a liquid-crystal cell.

DESCRIPTION OF THE DRAWINGS

The single FIGURE of the accompanying drawing is a schematic cross section of a liquid-crystal cell.

DESCRIPTION OF THE PREFERRED EMBODIMENT

A first substrate 1 is provided with a polarizer 2 on one side, in the FIGURE on the bottom side, and with a transparent electrode 3 on the other. A spacer 4 connects the first substrate 1 with a second substrate 5. On the side facing the first substrate 1, the second substrate 5 is provided with transparent electrode 6. On the other side, the second substrate 5 supports a polarizer 7. The liquid crystal 8 is contained in the space enclosed by the substrate 1 and 5 and the spacer 4.

The substrates 1 and 5 may be made of glass, plastic, or any other suitable transparent material. They can have the dimensions of a liquid-crystal cell but may also occupy a larger area on which two or more liquid-crystal cells can be fabricated simultaneously. The spacer 4 may be a body which divides the liquid-crystal cell into several areas. In another embodiment, balls or fiber particles are present in the liquid crystal as spacing means.

In the case of thin liquid-crystal cells, or if the energizable area of the liquid-crystal cell does not include the edge regions of the liquid crystal, the two substrates may also be directly bonded together (not shown).

The liquid-crystal cell 9 can be used as a liquid-crystal display or as a light valve of an optical printer. In the reflective mode of the liquid-crystal display, a mirror is provided on the polarizer; in the transmissive mode, this mirror is not present or is folded away.

As liquid-crystal cells are known per se, further details will not be described here.

In describing the manufacture of the liquid-crystal cell 9, it will be assumed that the substrates 1, 5 were already provided, in a conventional manner, with the transparent electrodes 3, 6, insulating layers (not shown), aligning layers (not shown), and polarizers 2, 7; the polarizers may also be attached later.

The spacer 4 is positioned on the suitably prepared first substrate 1. Then, the pulverized liquid-crystal material is sprinkled into the space formed by the spacer 4 and the first substrate 1. To prepare the liquid-crystal powder, a liquid phase liquid-crystal material is put into a vessel which is in thermal contact with liquid nitrogen. As a result, the liquid-crystal material is cooled to a temperature of about 100° K. While 100° K. is a temperature that is applicable to most liquid-crystal materials, what is important is that the liquid-crystal material be cooled to a temperature at which the liquid-crystal material solidifies which temperature is preferably 20° C. below the melting point of the particular liquid-crystal material. Subsequently, it is ground in a mortar. After the grinding, the grain size of the powder should be less than 50 micrometers because otherwise the liquid-crystal cell would "bake up" too much during the sealing process, whereby the layers of the substrate could be damaged.

In the next step, the quantity of liquid-crystal powder required for a liquid-crystal cell is weighed and can then be sprinkled onto the substrate.

After being sprinkled into the space formed by the spacer and the first substrate 1, the powder is dried at room temperature to eliminate any water or moisture that may have accumulated during the cooling step. In weighing the powder, the volatilizing portion of the liquid-crystal material must be taken into account.

After the drying process, the suitably prepared second substrate 5 is put on the spacer 4 in a vacuum with a pressure p less than 500 pascals ($N/m^2$) and permanently connected with the spacer, so that the liquid-crystal cell 9 is hermetically sealed. The liquid-crystal cell 9 is then heated to a temperature above the clearing point of the liquid crystal 8, which evenly spreads in the space enclosed by the two substrates 1 and 5 and the spacer 4. Any residual gasses in this space are absorbed by the liquid crystal 8. The clearing point of the liquid crystal depends upon the particular liquid-crystal material used, but is in general approximately 70° C. for liquid-crystal material used in display cells. Liquid-crystal material is in general a liquid crystalline substance which is transparent at temperatures between 20° and 60° C. When the temperature is reduced to a much lower level, the liquid-crystal becomes pastey and turbid. To regain the former transparency the liquid-crystal material must be warmed to a higher temperature known as the clearing point which in most cases is approximately 70° C.

Balls or fiber particles serving as spacing means (not shown) can be sprinkled either onto the first substrate prior to the application of the liquid crystal 8 or onto the liquid crystal 8 after its application. These spacing means also may already be contained in the liquid-crystal material.

The liquid-crystal cell 9 is sealed by adhesive bonding or soldering, for example, depending on the materials used for the two substrates 1, 5 and the spacer 4.

Instead of the spacer, an adhesive strip can be used which is squeezed when the liquid-crystal cell is being sealed. It must be ensured that during the sealing process, the liquid-crystal material is still in powder form or at least highly viscous so as not to be sqeezed broad.

I claim:

1. A method of manufacturing a liquid-crystal cell having a first substrate, a bordering means on said first substrate, a second substrate and liquid phase liquid-crystal disposed in a space between the substrates and the bordering means, said method comprising the steps of:

cooling the liquid phase liquid-crystal material to a temperature lower than 20° C. below the melting point of said liquid-crystal material so that the material solidifies;

grinding the liquid-crystal material to a grain size less than 50 micrometers;

sprinkling the liquid-crystal material into the space;

drying the liquid-crystal material;

sealing the liquid-crystal cell with the second substrate in a vacuum; and heating the liquid-crystal material to a temperature above the clearing point of the liquid-crystal material.

2. A method as claimed in claim 1, wherein the bordering means positioned on the first substrate is a spacer which is placed on the first substrate, and the liquid-crystal cell is sealed by putting the second substrate on the spacer.

3. A method as claimed in claim 1, wherein the bordering means positioned on the first substrate is an adhesive strip which is placed on the first substrate, and the liquid-crystal cell is sealed by putting the second substrate on the adhesive strip and subsequently squeezing the adhesive strip.

4. A method as claimed in claim 5, wherein the liquid-crystal material is cooled to a temperature of about 100° K. before being ground.

* * * * *